United States Patent Office 2,785,051
Patented Mar. 12, 1957

2,785,051

METHOD OF MAKING SILICA GEL

Ernest B. Miller, Houston, Tex., assignor to Jefferson Lake Sulphur Company, New Orleans, La., a corporation of New Jersey No Drawing. Application August 12, 1953,
Serial No. 373,897

2 Claims. (Cl. 23—182)

This invention relates to an improved type of heat stable silica gel and to a method of manufacturing the same.

This application is a continuation-in-part of my co-pending U. S. applications, Ser. No. 184,337, filed September 11, 1950, entitled Method of Making Silica Gel; Ser. No. 184,338, filed September 11, 1950, entitled Silica Gel; and Ser. No. 184,339, filed September 11, 1950, entitled Method of Making Silica Gel, all three applications now abandoned.

One of the objects of the invention is to provide a new type of low density silica gel which will remain relatively stable at high temperatures, such as are encountered in carrying out catalytic reactions.

Another object of the invention is to provide a silica gel of the type set forth, which is eminently suited for use as a catalyst carrier to effect catalytic reactions at temperatures ranging from about 1000° F. to about 1600° F., without substantial alteration of its internal cell structure.

A further object of the invention is to produce a low density silica gel of the type set forth, which has pores of large average size to permit it to be impregnated with an optimum amount of a catalytic agent and which has a much larger total surface area, per unit of weight, than other silica gels of low density.

A further object of the invention is to produce a silica gel which, after being impregnated with a catalytic agent, will maintain an adequate pore volume and surface area, per unit of weight, at high catalytic reaction temperatures, and wherein the average pore size is such as to permit efficient flow of reactant gases to and from the catalytic surface area.

A further object of the invention is to produce a low density silica gel of the character set forth, which will not shrink to such an extent as to materially affect its total pore volume and surface area at temperatures ranging between about 1000° F. and about 1600° F.

Another and more specific object of the invention is to provide a heat stable silica gel of the type set forth having an apparent density ranging between about 28 pounds and about 32 pounds per cubic foot, with pores of such average size as to permit impregnation of the gel with 10% to 15% by weight of ordinary metal oxide catalysts and also having a surface area of upwards of 700 meters per gram.

A further object of the invention is to provide an improved method of making a low density silica gel having the foregoing characteristics.

Another object of the invention is to provide a reliable method of making silica gel whereby the total pore volume, average pore size, and total surface area, per unit of weight of the product, can be controlled.

A still further object of the invention is to provide an improved method of making silica gel of the type set forth, employing a preliminary heating step for the hydrosol to set it in the form of a friable hydrogel, which can be readily handled in subsequent washing and heat treatments without destructive decrepitation and to influence its final physical characteristics.

Still another object of the invention is to provide an improved method of producing silica gel of the type set forth, employing washing and heat treating steps which influence the density and porosity of the ultimate product.

Other aims and advantages will appear in the following description of the product and examples of the method of making the same.

The known silica gels are not suitable for efficient use as catalyst carriers for carrying out catalytic reactions at elevated temperatures above about 1000° F. Low density silica gels heretofore produced have abnormally large pores which result in such reduced total surface area as to make them wholly unsuited for promoting efficient catalytic reactions. The ordinary, high density silica gels have such small pores that they cannot be impregnated with a sufficient quantity of catalytic agents without so obstructing the pores as to prevent the free entry and circulation of reactant gases in contact with the internal surface of the gel.

I have discovered a new and improved low density silica gel which overcomes the foregoing objections and is capable of being impregnated with relatively large quantities of catalytic agents, such as iron oxide, alumina, nickel oxide, chromium oxide, copper oxide, and the like, to effect catalytic reactions within a wide range of elevated temperatures without destructive shrinkage and substantial alteration of the pore structure. The impregnated gel is useful in various types of processes, such as the recovery of elemental sulphur from hydrocarbon gases and waste gases of various types, treatment of hydrocarbon vapors, including catalytic cracking, catalytic reforming, catalytic hydrogenation, catalytic synthesis, and the like.

Silica gel, made in accordance with my invention, is composed of substantially pure silica derived from a solution of acid and sodium silicate, and examples of the method of making it will be hereinafter set forth. It is screened to a desired particle size for different uses. As an example, the sizes are such that most of the pieces will pass through an eight mesh to ten mesh screen. It distinguishes from other types of silica gel in exhibiting radically different physical characteristics and heat stability, as hereinbefore stated.

The dry silica gel has a negligible moisture content of about 3% to 6% of the dry weight of the product. One sample of the silica gel had an apparent density of approximately 29 pounds per cubic foot, ignoring the small moisture content which is always present in the dry product. It also exhibited the following physical properties: a surface area of approximately 755 square meters per gram; a pore volume of approximately .68 cc. per gram; and an average pore diameter of approximately 36 Angstroms. Another sample had a total surface area of approximately 715 square meters per gram; a pore volume of .75 cc. per gram; and an average pore diameter of 42 Angstroms. These measurements were determined by the standard B. E. T. nitrogen adsorption test, as explained in the Journal of the American Chemical Society, vol. 60, page 309.

A sample of a known, commercial silica gel of the general type disclosed in the U. S. patent to Patrick, No. 1,297,724, and having a comparable total surface area and average pore diameter was tested and found to have the following physical characteristics: an apparent density of approximately 43.7 pounds per cubic foot; a total surface area of approximately 690 square meters per gram; a total pore volume of approximately .43 cc. per gram; and an average pore diameter of 25 Angstroms. The Patrick type silica gel has also been made in accordance with my U. S. Patent No. 1,674,558 and U. S. patent to Connolly and Miller No. 1,900,859. It is characterized by the fact that its total surface area is increased as the density increases.

My silica gel also was found to have unexpected vapor adsorptive properties. These properties were determined by passing air at different relative humidities and at a temperature of 86° F., through samples of the product in the usual manner. At 20% relative humidity, the gel adsorbed moisture equivalent to 7.24% of its original weight; at 40% relative humidity, 14.7%; at 50% relative humidity, 22%; at 60% relative humidity, 30.8%; at 80% relative humidity, 65%; and at 100% relative humidity, 75.3%. It will be noted that the increase in moisture adsorption from 40% relative humidity to 80% relative humidity, was 50.3%, and the amount of moisture adsorbed at 80% relative humidity was more than double the amount adsorbed at 60% relative humidity.

In contrast with the above characteristics, a test of the well known Patrick type gel having an apparent density of 43.7 pounds per cubic foot, was made under similar conditions. At 20% relative humidity, it adsorbed moisture equivalent to 10.25% of its original weight; at 40% relative humidity, 22.6%; at 60% relative humidity, 34.8%; at 80% relative humidity, 38%; and at 100% relative humidity, 40.5%. Thus, it will be seen that the gain in moisture content between 60% relative humidity and 80% relative humidity was only 3.2%. This indicated that the pore sizes of the Patrick type gel were practically uniform; whereas, the great increase in moisture adsorption of my new type gel indicated that it contained a large number of pores of intermediate size which were capable of adsorbing large amounts of moisture within the higher range.

A sample of the first mentioned batch of silica gel was tested by the aforesaid B. E. T. method to determine its heat stability at different elevated temperatures and exhibited the following physical characteristics:

After being heated to 600° F. in a muffle furnace for about two hours, the total surface area was 755 square meters per gram; the pore volume was .68 cc. per gram; and the average pore diameter was 36 Angstroms. After the gel was heated to a temperature of 1200° F. for two hours in a muffle furnace, the total surface area was 686 square meters per gram; the pore volume was .64 cc. per gram; and the average pore diameter was 37 Angstroms. After being heated to a temperature of 1575° F. for two hours in a muffle furnace, the total surface area was 560 square meters per gram; the pore volume was .57 cc. per gram; and the average pore diameter was 41 Angstroms. The apparent density of the sample was approximately 29 pounds per cubic foot after it had been heated to 600° F.; 32 pounds per cubic foot after it had been heated to 1200° F.; and approximately 36 pounds per cubic foot after it had been heated to 1575° F.

Thus, it was shown that the gel was highly stable at the elevated temperatures, even above 1000° F. The pore structure of the gel did not break down to such an extent that it could not be reused after high activating temperatures such as are encountered in carrying out high temperature catalytic reactions.

A test of the Patrick type silica gel showed that it exhibited the following physical characteristics: after the heat treatment at 600° F., as aforesaid, it had a total surface area of 690 square meters per gram; a pore volume of .43 cc. per gram; and an average pore diameter of 25 Angstroms. After it was heated to 1200° F., it had a total surface area of 640 square meters per gram; a pore volume of .34 cc. per gram; and an average pore diameter of 21 Angstroms. After it had been heated to 1575° F., it had a total surface area of 410 square meters per gram; a pore volume of .29 cc. per gram; and an average pore diameter of 28 Angstroms. The apparent density of this gel was 49 pounds per cubic foot after it was heated to 1200° F., and 64.8 pounds per cubic foot after it was heated to approximately 1600° F. It had shrunk and its cell structure had changed to such an extent that it could not be reused efficiently for carrying out the high temperature catalytic reactions.

Referring now to the method of making the improved silica gel, it is derived from a sol which is composed of a mixture of acid such as dilute sulphuric acid and sodium silicate; although it is contemplated that hydrochloric acid may be employed. A suitable mixture of acid and sodium silicate is made up in a well known manner, care being taken to introduce a slight excess of the acid to maintain the stability of the solution while it is being stirred to form the hydrosol. The hydrosol is then introduced into shallow trays to a depth of about ¼ to ½ inch and it is set and preheated to a critical temperature in the trays. While it may be set at room temperature and thereafter preheated, it is preferably subjected to a preheating temperature of from 250° F. to 350° F. for a period ranging from 30 minutes to about one and one-half hours, to raise the final temperature of the hydrogel to from about 190° F. to about 205° F. This is done by employing recirculating heated air which is nearly saturated with moisture to enable the hydrogel to be heated quite rapidly. At the same time, care is taken not to evaporate moisture equivalent to more than about 25% to 55% of the original weight of the hydrogel. This setting and preheating step produces a friable hydrogel which is capable of being handled in the subsequent washing and heating steps and influences the final density and porosity of the ultimate product. It is broken or cut into small pieces, not exceeding about one-half inch cube. Then, it is subjected to washing and heating treatments to remove the contained sodium salt and to shrink the pieces to their final size, and the pieces are finally dried to a moisture content of not more than about 6% of the dry weight of the gel.

The washing step may be accomplished in a single operation, using substantially pure wash water of a neutral pH, at a temperature of approximately 150° F., to remove all of the contained sodium salt from the hydrogel. However, excellent results have been obtained and the final properties of the product better controlled, by washing the hydrogel in two separate steps, removing a controlled portion of the sodium salt therefrom in the first partial washing step; then, heating the partially leached hydrogel to shrink the pieces to about their ultimate size while the pores remain filled with residual sodium salt. The pieces are then thoroughly washed with hot water at a temperature of about 175° F. to remove substantially all of the sodium salt. Then, they are heated to a temperature of about 350° F. in a drying oven to reduce their final moisture content to about 6% of the dry weight of the gel. The pieces are then screened to produce particles of the desired size and they are stored and kept dry until they are ready for use or to be impregnated with a catalytic agent such as alumina, iron oxide, and the like.

In accordance with one example of the method, employing the single washing step, stable hydrosol is made by mixing dilute sodium silicate and dilute sulphuric acid in the proper proportions. The sodium silicate solution is about 24° Baumé strength and is made by mixing sodium silicate with water at room temperature. The sulphuric acid solution is preferably about 25° Baumé strength and is also made by mixing it with water and cooling it to room temperature. Then, these solutions are mixed in about equal proportions in the usual manner, care being taken to make sure that the solution at all times has a slight excess acidity, to avoid precipitation of the silicate therein and thus make it stable. This mixture is raised in temperature by about 10° F. to 15° F., due to the exothermic heat of the reaction.

The hydrosol, thus produced, is immediately transferred to suitable setting and drying pans or trays and is subjected to heat treatment in shallow layers preferably about ½ inch in depth to insure that the hydrosol may be heated uniformly throughout its depth.

The hydrosol is gradually and uniformly heated until it reaches a temperature of from about 190° F. to about 205° F. This is preferably accomplished by exposing the hydrosol to recirculating hot air in a closed oven at a temperature ranging between 250° F. and 350° F., the recirculating air being confined in the oven and maintained at a high relative humidity to avoid excessive evaporation, thereby making it possible to raise the hydrogel to the desired temperature without evaporating nearly all of the moisture. It is contemplated that the hydrogel may be allowed to set and this heat treatment accomplished in other ways, for example, the source of heat may be infra red lamps or the like.

The hydrosol is heated in the oven for about 30 minutes to one and one half hours, depending upon the temperature of the recirculating air, to set the hydrogel and heat it to a temperature of about 200° F. During this step a substantial portion of the contained moisture in the hydrogel is vaporized, without removing any of the sodium salt.

I have found that it is desirable to control the amount of moisture removed, not only to affect the hardness or friability of the hydrogel, which shrinks in volume as the moisture is removed, but also to influence the porosity of the ultimate product. The moisture is removed in an amount between 25% and 60% of the weight of the original hydrosol. Other factors being the same, the greater the amount of moisture removed, the harder the hydrogel will be and the less dense the ultimate product will be.

The friable hydrogel is cut or broken into pieces about ½ inch cube and removed from the pans for subsequent treatment. The cut pieces are next placed in a perforated washing basket and thoroughly washed with substantially pure hot water at a temperature of about 150° F., which dissolves and removes substantially all of the sodium salt. While this washing step may be accomplished in various ways known in the art, the basket is moved up and down in a large vessel supplied with numerous changes of fresh water. Fifteen changes of water with one hour of washing for each change are sufficient to remove the salt.

The washed pieces are next heated and dried in the usual manner to shrink them to their final volume, ready for use, or for subsequent impregnation. In the final heating step the pieces are subjected to a drying temperature of about 300° F. to 350° F. in the presence of circulating air until the moisture content is reduced to about 6% of the dry weight. This may be done in an ordinary drying oven. The average final size of the dried pieces is such that they will pass through an 8 mesh sieve.

The following is a specific example of the foregoing steps:

Make up one gallon of the hydrosol, using sodium silicate and sulphuric acid, as hereinbefore described. Place the hydrosol in shallow rectangular pans, filled to a depth of about ½ inch. Place the pans in a closed oven and expose them to recirculating air at a temperature of 300° F. for 1 hour and 15 minutes, to set the hydrogel and raise its temperature to approximately 200° F. During this preheating step, a small amount of the saturated air is permitted to escape from the oven and is replaced by fresh air, so that approximately 45% of the original weight of the hydrosol is evaporated, as moisture. Then cut the hardened hydrogel into pieces about ½ inch cube. Transfer the cut pieces to a perforated washing basket and wash them in a tub, using fifteen changes of water, about four gallons in each change, at 150° F. for a period of one hour in each change; then place the washed pieces in shallow trays and heat them in a drying oven at a temperature of 350° F. until the moisture content is reduced to about 6% of the weight of the dried gel. This drying step requires about two hours.

In accordance with another example of the method, in which the hydrogel is washed in two separate steps to leach out the sodium salt, the preheated hydrogel is made in the same manner as stated in the first example.

The pieces of hydrogel are next subjected to a partial washing operation. They are washed with a predetermined amount of water to remove a definite portion of the sodium salt and to dilute the remaining sodium salt contained in them, whereby to further control the ultimate size of the pores and the density of the finished product. While this partial washing operation can be accomplished in various ways, the pieces are preferably placed in a perforated container and moved up and down in a tub containing the wash water for a period of about 3 hours, or until the proper dilution is completed. I have found that the density of the final product and the size of the pores can be controlled within a wide range if from 25% to 55% of the sodium salt is removed during this partial washing step. The more sodium salt removed during this washing step, the greater will be the density of the final product. The quantity of dilute sodium salt left in the pieces is a factor in determining the ultimate size of the pores in the product. The wash water is heated to an optimum temperature of about 150° F. to increase the solubility of the sodium salt. The wash water, containing from 25% to 55% of the sodium salt is finally drained out of the perforated container so that the pieces are ready for subsequent drying treatment. In this condition, the pieces are saturated with water and a greater portion of it must be removed by subsequent heating.

The partially washed pieces are again placed in drying pans, or containers, one layer deep, and they are again exposed to heat treatment. This heating step is preferably accomplished in a drying oven, employing dry air at a temperature ranging from, say 300° F. to 350° F. The pieces are heated for two or three hours or until they contain residual moisture equal to 50% to 55% of their dry weight. During this heat treatment, the pieces shrink to practically their ultimate size, but the pores remain filled with concentrated sodium salt, which must be removed to produce the final product.

The pieces are next transferred to a washer of any suitable type, where they are thoroughly washed with substantially pure hot water at a temperature of 175° F. This final washing operation is carried on until substantially all of the sodium salt is removed and it is preferably done by placing the pieces in a perforated container and moving it up and down in a tub or vat containing the wash water. Ten to fifteen changes of water with each change being used for about an hour, are sufficient for this purpose.

The finally washed pieces are next subjected to final drying treatment by heated air until the moisture content is reduced to approximately 6% of the final dry weight. Then, the product is ready for storage for subsequent use.

The following steps were employed in practicing the second example. At room temperature, 4730 ml. of 24° Baumé sodium silicate was gradually poured into and thoroughly mixed with 4730 ml. of 25° Baumé $H_2SO_4$. The heat of the reaction increased the temperature of the solution only slightly to produce a stable hydrosol. This hydrosol was immediately poured into shallow trays or rectangular pans to a depth of about ½ inch and the trays were placed in a closed oven heated by recirculating hot air at a temperature of about 230° F. for 1 hour and 40 minutes to set the hydrogel and raise its temperature to 190° F. During this period, water was evaporated equivalent to 45.6% of the weight of the original hydrosol.

The hot hydrogel was removed from the oven, cut or sliced with a knife in criss cross fashion to form pieces of about ½ inch cube. These pieces were placed in a perforated washing basket and washed in 6500 ml. of water maintained at 150° F. contained in a large vessel and the said basket moved up and down in the wash water. The hydrogel was washed in this manner for three hours. This washing step removed 50.2% of the sodium salt which previously resulted from the reaction of sodium silicate and sulphuric acid, allowing 49.8% of the original sodium salt to remain in the hydrogel in a diluted form which had to be washed out in the final washing step. The partially washed pieces were then transferred to the drying pans in layers of about ½ inch thickness and subjected to heat treatment in an oven with the air at a temperature of 260° F. for 1½ hours or until the moisture content was reduced to approximately 53% of the dry weight. The hydrogel had then shrunk to about 20% of its original volume. Furthermore, the pieces became correspondingly harder and structurally stronger.

The pieces were then transferred to the washing basket and thoroughly washed with 15 changes of substantially pure water at 175° F. The amount of water used for each of these changes amounted to about four gallons and the basket was moved up and down for 1 hour in each change of water. The sodium salt remaining in the gel amounted to .01%. At the conclusion of this washing step the pieces of gel were fully saturated with practically pure wash water.

The wet gel was removed from the washing basket and placed in drying pans at a depth of ¼ inch to ½ inch and finally dried in the oven with the air at a temperature of about 300° F. for about 2½ hours or until the moisture content was reduced to about 6% of the dry weight of the gel. The pieces were of such size that a great majority of them would pass through an 8 mesh screen. The pieces were then screened and stored for subsequent use. This batch of gel had an apparent density of approximately 29.2 pounds per cubic foot. It also had a total surface area of approximately 755 square meters per gram; a pore volume of approximately .68 cc. per gram; and an average pore diameter of approximately 36 Angstroms, as shown by the aforesaid B. E. T. test. A sample of another bath had a total surface area of approximately 715 square meters per gram; a total pore volume of approximately .75 cc. per gram; and an average pore diameter of 42 Angstroms. The slight differences in the foregoing physical properties probably resulted from slight variations in the practice of the method and/or discrepancies in making the tests.

From the foregoing description, it will be readily apparent that this invention provides a new type of silica gel which is capable of a wide variety of uses, both as an adsorbent as well as a catalyst carrier. It is capable of carrying any amount of catalyst up to about 15%, which is sufficient to carry out all ordinary catalytic reactions. It is highly stable at all temperatures which are practicable for carrying out ordinary catalytic reactions. It will stand repeated heat activation and reactivation at the highest temperatures encountered in catalytic processes without serious deterioration.

Obviously, the invention is not restricted to the particular embodiment thereof herein described.

What is claimed is:

1. In the method of making silica gel comprising mixing an inorganic acid and sodium silicate solutions to form a silica hydrosol, allowing the hydrosol to set to form a hydrogel and subjecting the hydrogel to subsequent washing and drying treatments to form the finished product, the improvement which comprises subjecting the set hydrogel, before any salts are washed out, to a current of air nearly saturated with water vapor and maintained at 250° F. to 350° F. for a period of from 30 to 90 minutes to raise the final temperature of the hydrogel to from 190° F. to 205° F. to harden the hydrogel and influence the ultimate porosity, density and heat stability of the finished product while controlling the evaporation of moisture so that the amount of moisture evaporated from the hydrogel will not be more than about 60% of the original weight of the hydrosol; cutting the hydrogel into small pieces after its temperature has been raised to the required degree; thoroughly washing the pieces with substantially pure hot water to remove substantially all of the contained salt; and finally drying the washed pieces until the moisture content is reduced to about 6% of the dry weight of the product.

2. In the method of making silica gel comprising mixing an inorganic acid and sodium silicate solutions to form a silica hydrosol, allowing the hydrosol to set to form a hydrogel and subjecting the hydrogel to subsequent washing and drying treatments to form the finished product, the improvement which comprises subjecting the set hydrogel, before any salts are washed out, to a current of air nearly saturated with water vapor and maintained at 250° F. to 350° F. for a period of from 30 to 90 minutes to raise the final temperature of the hydrogel to from 190° F. to 205° F. to harden the hydrogel and influence the ultimate porosity, density and heat stability of the finished product while controlling the evaporation of moisture so that the amount of moisture evaporated from the hydrogel will not be more than about 60% of the original weight of the hydrosol; cutting the hydrogel into small pieces; washing the pieces with hot water to remove from about 25% to about 55% of the contained salt, so that a substantial percentage of the original salt remains in the hydrogel; drying the washed pieces until their moisture content has been reduced to about 53% of their dry weight; finally washing the partially dried pieces with hot water to remove substantially all of the remaining salt; and finally drying the washed pieces until the moisture content is reduced to about 6% of the dry weight of the product.

References Cited in the file of this patent

UNITED STATES PATENTS

| | | |
|---|---|---|
| 1,297,724 | Patrick | Mar. 18, 1919 |
| 1,674,558 | Miller | June 19, 1920 |
| 1,798,766 | Stoewener | Mar. 31, 1931 |
| 1,900,859 | Connolly et al. | Mar. 7, 1933 |
| 2,588,853 | Kumins et al. | Mar. 11, 1952 |

FOREIGN PATENTS

| | | |
|---|---|---|
| 524,142 | Great Britain | July 31, 1940 |

OTHER REFERENCES

Plank et al.: "Differences between Silica and Silica-Alumina Gels," in Journal of Colloid Science, vol. 2, No. 4, August 1, 1947, pages 399 to 412 inclusive.